(12) United States Patent
Hansen et al.

(10) Patent No.: US 7,839,036 B2
(45) Date of Patent: Nov. 23, 2010

(54) CAN OF WET-RUNNING ELECTRIC MOTOR AND PUMP ASSEMBLY

(75) Inventors: Jørn Toftegaard Hansen, Silkeborg (DK); Cecilie Høj Laursen, Hadstein (DK); Carsten Bloch, Tarm (DK); Jens Vestergaard Boll, Bjerringbro (DK)

(73) Assignee: Grundfos Management a/s, Bjerringbro (DK)

( * ) Notice: Subject to any disclaimer, the term of this patent is extended or adjusted under 35 U.S.C. 154(b) by 0 days.

(21) Appl. No.: 12/067,871

(22) PCT Filed: Sep. 20, 2006

(86) PCT No.: PCT/EP2006/009114

§ 371 (c)(1),
(2), (4) Date: Aug. 18, 2008

(87) PCT Pub. No.: WO2007/033818

PCT Pub. Date: Mar. 29, 2007

(65) Prior Publication Data

US 2009/0026878 A1    Jan. 29, 2009

(30) Foreign Application Priority Data

Sep. 24, 2005   (EP) .................................. 05020867

(51) Int. Cl.
*H02K 5/10* (2006.01)
*H02K 5/12* (2006.01)

(52) U.S. Cl. .............................. 310/87; 310/86; 310/88

(58) Field of Classification Search ............. 417/423.3, 417/423.12, 423.7; 310/86
See application file for complete search history.

(56) References Cited

U.S. PATENT DOCUMENTS

| | | | | |
|---|---|---|---|---|
| 2,766,698 A | * | 10/1956 | Carter | 415/58.3 |
| 5,660,520 A | * | 8/1997 | Scarsdale | 415/104 |
| 5,923,111 A | * | 7/1999 | Eno et al. | 310/156.25 |
| 6,039,827 A | * | 3/2000 | Cramer | 156/173 |
| 6,293,772 B1 | * | 9/2001 | Brown et al. | 417/420 |
| 6,443,710 B1 | * | 9/2002 | Tatsukami et al. | 417/365 |
| 6,464,458 B2 | * | 10/2002 | Vild et al. | 415/200 |
| 7,118,354 B2 | * | 10/2006 | Kenney et al. | 417/366 |
| 2007/0051510 A1 | * | 3/2007 | Veneruso et al. | 166/244.1 |

FOREIGN PATENT DOCUMENTS

| | | | | |
|---|---|---|---|---|
| DE | 8816412 U1 | * | 8/1989 | |
| EP | 0658967 A2 | * | 6/1995 | |
| JP | 09004587 A | * | 1/1997 | |
| JP | 2004289966 A | * | 10/2004 | |

OTHER PUBLICATIONS

Machine Translation EP0658967A2 and DE8816412U1.*
Machine Translation JP09004587 (1997), JP2004289966 (2004), EP0658967 (1995) and DE8816412 (1989).*

* cited by examiner

*Primary Examiner*—Quyen Leung
*Assistant Examiner*—Jose A Gonzalez Quinones
(74) *Attorney, Agent, or Firm*—Panitch Schwarze Belisario & Nadel LLP (57) ABSTRACT

A can of a wet-running electric motor can be produced from a non-metallic material, wherein the non-metallic material is provided with at least one additional hermetically sealing layer. A pump unit having a can of this type is also provided.

25 Claims, 4 Drawing Sheets

CAN OF WET-RUNNING ELECTRIC MOTOR AND PUMP ASSEMBLY

CROSS-REFERENCE TO RELATED APPLICATIONS

This application is a Section 371 of International Application No. PCT/EP2006/009114, filed Sep. 20, 2006, which was published in the German language on Mar. 29, 2007, under International publication No. WO 2007/033818 A1 and the disclosure of which is incorporated herein by reference.

BACKGROUND OF THE INVENTION

The invention relates to a can of a wet-running electric motor, as well as to a pump assembly with a wet-running electric motor and with such a can.

Different types of pump assemblies are known, for example heating circulation pumps and submersible pumps, which are designed as wet-runners, i.e., wherein the rotor runs in the fluid. With these wet-running electric motors a can is provided inside of the stator and seals the rotor space, in which the rotor rotates and which is filled with fluid, to the stator. The cans are often manufactured of metal, in particular stainless steel. This, however, has the disadvantage that the magnetic field between the stator and the rotor is compromised, so that a worsening of the efficiency of the motor occurs. Furthermore, cans of plastic are known with which this problem does not occur. These cans, however, have the disadvantage that small quantities of fluid diffuse through the can into the stator space. For this reason, such cans may not be used, particularly with submersible pumps where there is no possibility whatsoever of leading away the fluid out of the stator space. Until now, with such pumps, cans of metal necessarily had to be applied, which worsen the efficiency of the pump, or the stator had to be molded with a molding mass receiving the fluid or protecting the hidings.

BRIEF SUMMARY OF THE INVENTION

It is an object of the invention to provide an improved can and a pump assembly with such a can, which on the one hand permit an increased efficiency of the pump assembly, and on the other hand securely prevent a penetration of fluid into the stator space.

The can according to the invention comprises a non-metallic material, i.e., a material which influences the magnetic field between the rotor and the stator as little as possible, or not at all. A worsening of the efficiency, due to the arrangement of the can between the stator and the rotor, is avoided by the fact that the magnetic field remains uninfluenced by the material of the can. According to the invention, the non-metallic material of the can is provided with at least one additionally hermetically sealing layer. Such an additional layer which is preferably deposited on the outer or the inner peripheral surface, or on both peripheral surfaces, permits the application of a material for the can, which per se does not have the adequate diffusion sealing ability by itself. This means that one may select a material which primarily ensures an adequate stability of the can.

The diffusion sealing ability, to the extent that fluid located in the inside of the can, i.e., in the rotor space, may not penetrate through the can into the stator space, is achieved by the additional layer, which is preferably deposited on the surface of the non-metallic material. Also several layers of different materials may be used in combination, in order to achieve the desired hermetic sealing between the inner space of the can and the outer peripheral region of the can. Thus, the can wall may be constructed in a multi-layered manner from the non-metallic material and one or more layers of further materials, which ensure the diffusion sealing ability. For example, the diffusion-tight layer which ensures the hermetic sealing, may be formed of a special plastic or paint. The diffusion-tight layer may further be formed, for example, as a tube, film or film pot, in particular of metal. After manufacture and shaping of the non-metallic material these may be deposited onto this material. Furthermore, it is possible to incorporate a film or a tube into the non-metallic material at the time of shaping this material, so that the hermetically sealing layer covers the tube or film on one or both sides or peripheral sides. Thus, the tube or the film may be arranged inside the non-metallic material. This may be effected, for example, during the injection molding of the non-metallic material.

Further preferably, the at least one layer is designed as a coating on the inner and/or outer peripheral surface of the non-metallic material. Such a coating may be deposited after the manufacture or shaping of the part of the non-metallic material, on its surface, for example by spraying on or vapor deposition.

Preferably, the coating is designed as a metallization of the non-metallic material. This means that a metal layer is deposited onto the inner and/or outer peripheral surface of the can, for example by vapor deposition. This metal layer then ensures a hermetic sealing. The coating of the non-metallic material, for example by metallization with a suitable material, is effected usefully such that the complete peripheral surface, which forms the separation between the rotor space in the inside of the can and the surrounding stator space, is accordingly coated in this region, so that no fluid, for example water from the inside of the can, may penetrate through the can wall into the surrounding stator space.

The can is particularly preferably manufactured of plastic and preferably of a fiber-reinforced plastic. Plastic permits an inexpensive manufacture of the can, for example in an injection molding method. Furthermore, plastic has no magnetic properties whatsoever, and therefore does not influence the magnetic field between the stator and the rotor. Furthermore, plastic is suitable for coating or for being provided with further, surrounding and inner-lying plastic layers, in the manner of co-extrusion. A metallization of plastic is also possible without any problem. The fiber-reinforced construction may improve the stability or the pressure strength of the can.

Preferably, the can is manufactured of a tubular component and a base element, which closes the tubular component at a first axial end. This permits a simplified manufacture of the can, which for example also permits the manufacture of thin-walled plastic cans with the injection molding method. With the injection molding of the can, it may be useful for a core forming the cavity in the inside of the can, to be held at both axial ends of the can, in order to achieve a very thin-walled design of the can. Thus, first, the tubular component is manufactured, and then later the base element is inserted into this tubular component, in order to close an axial opening of the tubular component and to form a canned pot. The opposite axial side of the can is designed in an open manner, so that the rotor shaft may extend to the pump space through this axial side. The base element may be inserted into the tubular component with a non-positive fit, a positive fit, and/or a material fit, so that a firm, stable and preferably sealed connection between the tubular component and the base element is created.

The base element is, particularly preferably, molded with the tubular component. Thereby, after the manufacture of the tubular component, the base element in a second manufacturing step in the injection molding method, may be injected or molded onto the tubular component, or molded into the tubular component, so that a permanent, sealed connection between the two elements is created.

The tubular component and the base element are further preferably both manufactured of a non-metallic material, preferably plastic, and after the assembly are commonly provided with the additional layer or coating. In this manner, the region of the base element and in particular the transition region between the tubular component and the base element, are also additionally hermetically sealed by the coating. For example, the tubular component and the base element may be metallized together. Alternatively, the additional layer on the base element may also be deposited separately or integrated into this base element.

According to a further preferred embodiment, a radially outwardly extending, preferably metallic collar is formed at one axial end of the can, preferably at the end which faces the pump space and the impeller of the pump, on the outer periphery. This metallic collar serves, for example, for the end-side closure of the stator housing, in which the stator winding is arranged. The stator housing, in particular when applied in a submersible pump, is preferably hermetically encapsulated, so that no fluid may penetrate into the inside of the stator housing. Thus, the coils inside the stator housing are protected, in particular from moisture. The metallic collar, which is attached on the outer periphery of the can, serves for the connection to the outer parts of the stator housing, and permits the can to be welded to the remaining stator housing.

The collar is preferably connected to the non-metallic material with a positive fit and/or material fit, and together with this, is provided with the additional layer or coating. Alternatively, a non-positive fit connection is also conceivable, inasmuch as an adequate strength and sealing ability is ensured. The common coating of the non-metallic material of the can and of the collar has the advantage that, in particular, the transition region between the non-metallic material and the collar is also hermetically sealed on account of the coating. In order to ensure a permanent sealing in this region, a particularly firm connection between the metallic collar and the non-metallic material of the can is preferred, so that movements between the two elements which could lead to a tearing of the coating, are avoided.

The metallic collar is preferably connected directly to the non-metallic material during manufacture of the can, in order to achieve a particularly firm connection between the metallic collar and the non-metallic material. In the case of injection molding the can of plastic, the metallic collar, for example, may be inserted into the tool before the injection molding, and the plastic injected onto the collar, or a part of the collar is peripherally injected with plastic, so that a positive fit connection and material fit connection between the two elements is achieved directly on injection molding.

One surface of the collar is preferably structured or roughened before the connection to the non-metallic material of the can, in order to further improve the connection between the collar and the non-metallic material. This may be effected, for example, by laser radiation, wherein small recesses and/or crater-like raised parts are incorporated into the surface of the collar by a laser beam, into which the non-metallic material, plastic for example, flows when molding, and thus creates a firm connection to the collar, on the one hand via a larger surface area, and on the other hand via a positive fit.

According to the invention, a pump assembly with a wet-running electric motor is also provided, which comprises a can according to the preceding description.

The electric motor is preferably a permanent magnet motor, i.e., the rotor is equipped with permanent magnets. Preferably, particularly strong, for example neodymium, magnets are applied in an order to achieve a high efficiency. The combination of permanent magnets with the non-metallic can has the advantage that a high efficiency of the motor may be achieved even by a permanent magnet rotor, since the can influences the magnetic field very little or not at all.

The pump assembly is particularly preferably designed as a submersible pump assembly. With regard to a submersible pump assembly, the inventive, hermetically sealed can has special advantages. It is indeed with submersible pump assemblies that it is important to prevent fluid, in particular moisture, from penetrating from the rotor space into the stator space, since there exists no possibility of evaporating the moisture in the stator space by the waste heat of the motor, since the stator space is hermetically encapsulated to the outside.

Further preferably, an impeller of the pump assembly may be driven by the electric motor at a maximal rotational speed of greater than 20,000 rpm, and axially seals the impeller in the region of the suction port. The rotational speed may also be greater than 25,000 or 30,000 rpm. The high rotational speed permits a large delivery output of the pump with an impeller with a small diameter. The small diameter of the impeller permits the friction and thus the losses of the pump assembly to be minimized. The axial sealing of the suction port has the advantage that the axial surface of the impeller may simultaneously serve as a sealing surface, so that the number of required sealing elements is reduced, and a simple sealing in the region of the suction port may be formed. This permits a further minimization of the friction in the pump assembly and thus of the power loss.

Moreover, at least one axial end of the impeller particularly preferably forms a thrust bearing surface. In this manner, the number of the required components for mounting the rotor is reduced, since the impeller itself may be part of the thrust bearing. This on the one hand permits a simplified and compact construction of the entire pump assembly, and on the other hand permits the power loss to be further minimized, and thus the efficiency to be increased. Particularly preferably, the bearing surface simultaneously serves as an axial sealing surface. This has the further advantage, that no additional pressing elements are required, in order to hold the seal in bearing. An adequately small gap which ensures a reliable sealing and simultaneously ensures an adequate lubrication film on the bearing surface, automatically sets in, in the thrust bearing which forms a sliding bearing. The gap preferably lies in the region of a few micrometers. This ensures a particularly good sealing at the suction port, which further contributes to increasing the efficiency of the pump assembly.

Further preferably, the impeller is designed in an open manner on its axial side at which the impeller blades are arranged, and the axial ends of the impeller blades form a thrust bearing surface of the impeller. This means that the axial, free ends of the impeller blades serve the axial mounting of the impeller and thus of the rotor shaft, and simultaneously the sealing of the impeller at its open end. A particularly good sealing is achieved very simply in this manner, since the impeller blades are pressed by the occurring axial force, which is to be accommodated by the thrust bearing, against an opposite thrust bearing surface, for example an upthrust washer. A very small gap between the axial ends of the blades and the upthrust washer is created by this, which simultaneously ensures a good sealing and an adequate lubrication film in the axial sliding bearing.

Usefully, the impeller is fixed on the rotor shaft in the axial direction, so that the impeller may assume the thrust bearing function of the whole rotor. This means that the axial mounting of the whole rotor is effected at the impeller, preferably in a sliding bearing, whose thrust bearing surface is formed by the axial end of the impeller, preferably by the axial ends of the impeller blades.

According to a further preferred embodiment, the axial side of the impeller which faces the electric motor is designed as a sealing surface for sealing the rotor space of the electric motor. This means that here, an axial sealing surface is also preferably provided, on which a stationary sealing element, for example a sealing ring, bears. This sealing ring may be pressed against the sealing surface by spring bias or elastic internal stress. The sealing of the rotor space is preferred, in order to prevent contamination from the fluid to be delivered by the pump assembly, which is preferably water, from penetrating into the rotor space, and there, leading to an undesired friction, or possibly even to damage to the rotor. The rotor space may be pre-filled with fluid at the factory. Alternatively, it is possible for the fluid to penetrate into the rotor space with the first starting operation of the pump assembly. This may be ensured by the seal not being designed in a completely fluid-tight manner between the impeller and rotor space, but merely being designed such that no contamination or only small quantities of fluid may enter into the rotor space. Thus, the fluid exchange between the pump space, in which the impeller rotates, and the rotor space in the inside of the can, is minimized or prevented. A very simple sealing with a minimized number of components may be ensured due to the fact that the sealing surface is provided directly on the impeller. Moreover, on account of the adequate sealing, one may ensure that no friction losses may occur due to contamination, whereby a greater efficiency of the pump assembly may be ensured in a permanent manner.

The impeller, particularly preferably, comprises at least one surface of carbide or ceramic, and is preferably completely manufactured of carbide or ceramic. This design permits the wear of the impeller blades, on account of contamination in the fluid, such as sand particulates for example, to be minimized or prevented. Moreover, the particularly hard and wear-resistant design of the impeller surfaces permits the use as sliding bearing surfaces or thrust bearing surfaces, so that one may do away with additional bearing shells or bearing elements. The wear-resistant design of the impeller furthermore permits the rotational speed of the impeller to be further increased, without excessive wear occurring. This permits the increase of the efficiency of the pump assembly without further stages having to be provided. Simultaneously, the impeller may be designed in a very small manner. A small impeller diameter leads to a reduction of friction losses, whereby the efficiency of the pump assembly may be increased further. Alternatively to the design of carbide and ceramic, or to the surface coating with carbide or ceramic, one may also apply other methods or coatings, for the surface hardening of the impeller, assuming that an adequate wear-resistance of the surfaces is achieved. Preferably, a hardness of the impeller surface is for example greater than 1000 HV. The design of the impeller completely of carbide or ceramic may be effected with a sintering method, for example, wherein the impeller blades are preferably subsequently ground, in order to design the ends of the impeller blades as a defined thrust bearing surface and sealing surface. If the opposite side of the impeller is likewise to be designed as a sealing surface, this too is preferably ground, in order to provide a defined contact surface.

The pump assembly according to the invention, particularly preferably, has only one stage. The number of required individual parts is significantly reduced by the design as a single-stage pump assembly. Furthermore, the friction occurring in the whole pump assembly is reduced, whereby the efficiency may be increased. Moreover, it is possible without any problem, as described above, to fix the impeller on the rotor shaft in the axial direction, which again permits the impeller to be sealed at the suction port in the axial direction, and preferably the impeller, at its side facing away from the electric motor, simultaneously forms a thrust bearing surface for the sliding mounting of the whole rotor in the axial direction. Again a very good sealing of the impeller may be achieved by this axial abutment of the impeller, whereby the efficiency is increased. The friction, which is reduced as a whole, preferably permits the whole pump assembly to be operated at a higher rotational speed, for example greater than 20,000 rpm, whereby one may achieve a high delivery output with only one stage. As previously described, the impeller is preferably simultaneously also to be designed in a very small manner with regard to its diameter, whereby the power loss is further reduced and the operation at a high rotational speed is favored. The diameter of the rotor is particularly preferably also very small, which may be achieved by particularly strong permanent magnets and a high efficiency of the electric motor, whereby the friction losses in the motor may be minimized, and the operation at a high rotational speed is favored. The rotor diameter is particularly preferably smaller than 25 mm, more preferably smaller than 20 mm. The smaller the rotor diameter, the less is the occurring friction.

Given a small rotor diameter, the electric motor which is reduced in size with regard to its diameter, may be designed longer in the axial direction, in order to be able to provide an adequate power of the electric motor. Preferably, a very stiff rotor shaft is provided, in order to render this possible. Such a very stiff rotor shaft may be achieved by designing the rotor shaft, including the axial end on which the impeller is attached, as one piece, ideally as one piece with the complete rotor.

An upthrust washer facing the impeller is further preferably provided, which bears on an axial side of the impeller, preferably the axial side which faces away from the electric motor, in a manner such that it forms a thrust bearing surface. Thus, a sliding bearing is formed between the axial end of the impeller or the impeller blades and the upthrust washer, the sliding bearing being able to serve as a thrust bearing of the impeller and of the whole rotor.

The upthrust washer preferably likewise comprises at least one surface of hard metal or ceramic material, in order to be able to ensure the wear characteristics, which are required for a sliding bearing surface and sealing surface, even at high rotational speeds. It is also possible to design the upthrust washer completely of carbide or ceramic material. Particularly preferably, only the part of the upthrust washer which faces the impeller is formed of such a material. The part which faces away from the impeller may be designed of another material or of metal and may, for example, be bonded to the part facing the impeller. Alternative methods or designs which ensure an adequate hardness or wear resistance of the surface of the upthrust washer may also be applied here.

The axial side of the upthrust washer which faces away from the impeller is preferably spherical, i.e., is designed in a hemispherical manner. This permits the mounting of the upthrust washer in a corresponding spherical or hemispherical receiver, so that a self-centering or self-alignment of the upthrust washer parallel to the impeller or the axial end of the impeller is achieved. On the one hand, this simplifies the assembly, and on the other hand ensures a wear-free and secure operation of the pump assembly even at high rotational speeds.

Preferably, the impeller is surrounded by a spiral housing or diffuser, whereby the delivered fluid radially exiting the impeller is deflected, such that it is led further preferably in the axial direction, and may be led out of the pump assembly into a connection conduit.

For this, the impeller is particularly preferably surrounded by a spiral housing, which extends helically in a manner such that the exit opening of the spiral housing is aligned in the axial direction to the impeller, i.e., parallel to its rotation axis. This has the effect that the fluid which exits from the impeller in a tangential, radial direction, is deflected by the spiral housing, with as little loss as possible, to an axially directed exit opening of the pump assembly.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
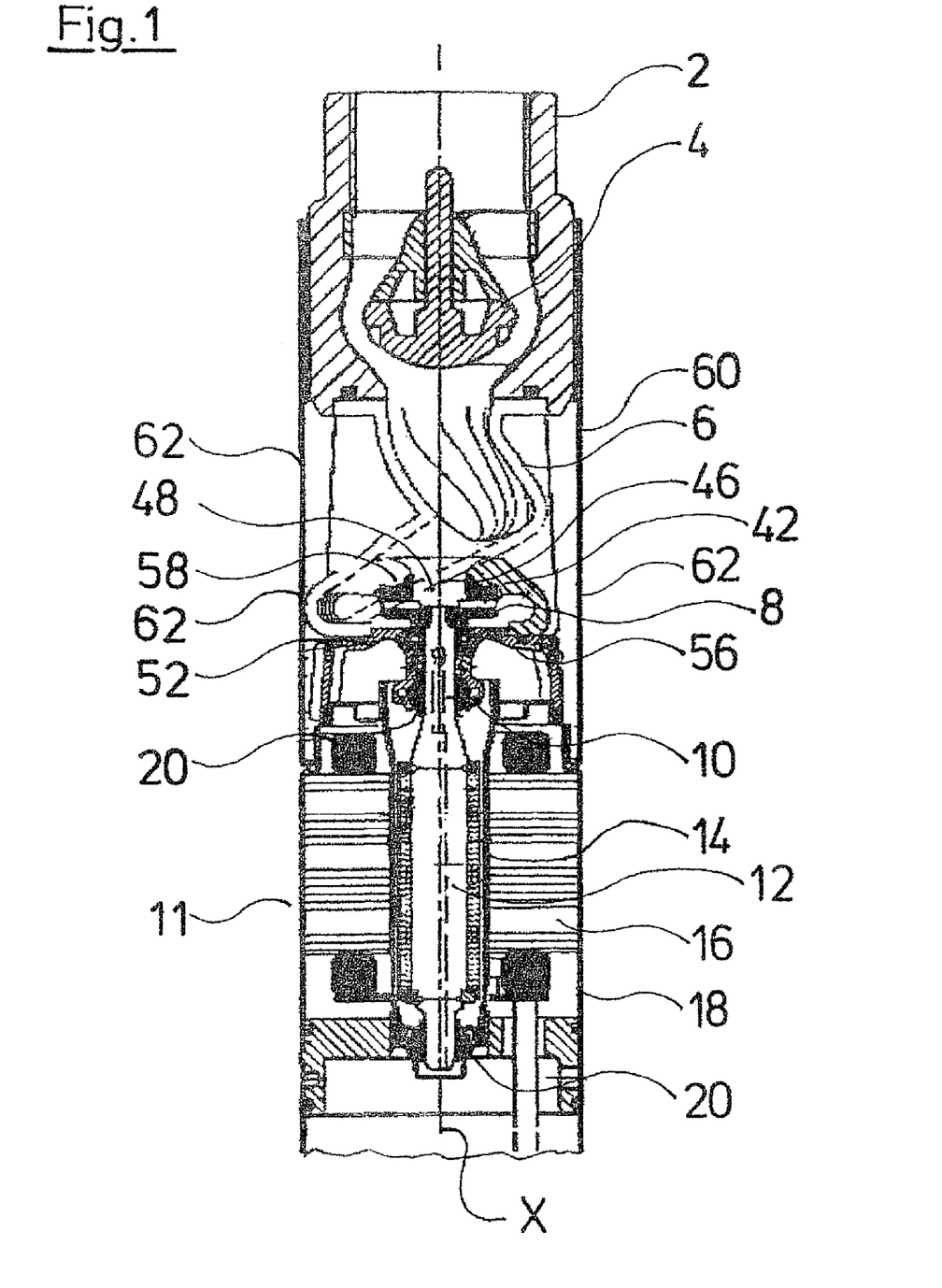
FIG. 1 is a longitudinal, sectional view of a pump assembly according to an embodiment of the invention.

FIG. 1 shows a longitudinal, sectional view of the upper end of a submersible pump. The lower end, in which the electronics for the control and regulation of the pump are accommodated, is not shown in the Figure. The pump assembly at its upper end comprises a connection stub 2 with a return valve 4 arranged therein. A spiral housing 6, which surrounds the impeller 8, connects upstream to the connection stub 2 inside the pump assembly. The impeller 8 is arranged at the axial end of the single-piece rotor shaft 10 of the electric motor 11 or its permanent magnet rotor 12. The impeller 8 is firmly fixed on the rotor shaft 10, in particular is also firmly connected in the axial direction X. The permanent magnet rotor 12 runs in the inside of a can 14, which is annularly surrounded by the stator 16 on its outer periphery. The stator 16 is designed in a known manner as a lamination bundle with coils windings. The stator 16, as a whole, is hermetically encapsulated in a stator housing 18. The rotor shaft 10 is mounted in the radial direction in two radial bearings 20. These radial bearings 20 are preferably designed in a self-centering manner, so that a simple assembly and a secure operation are ensured, also at high rotational speeds.

Figures 2, 3:
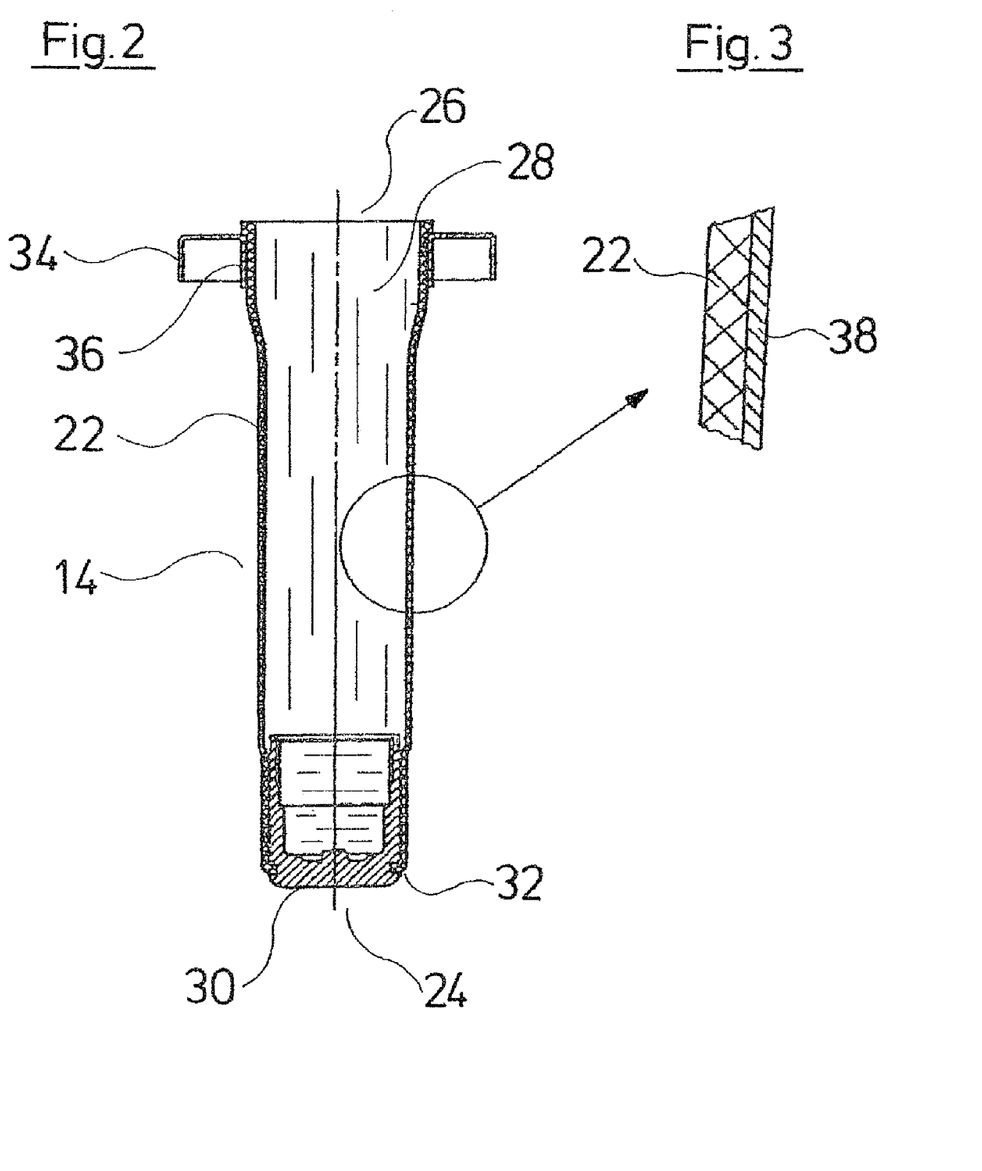
FIG. 2 is an enlarged, longitudinal, sectional view of the can of the electric motor of the pump assembly of FIG. 1.
FIG. 3 is an enlarged cut-out of the circled portion of FIG. 2

The can 14, as is shown in detail in FIGS. 2 and 3, is designed of plastic in the shown example. The can is formed of a tubular component 22, which is manufactured of fiber-reinforced plastic with an injection molding method. In order to be able to manufacture the tubular component 22 in a particularly thin-walled manner with the required precision, the tubular component 22 is first formed with open axial ends 24 and 26. This permits a core, which forms the inner space 28 of the can 14, which later forms the rotor space, to be fixed at both axial ends in the tool. After injection molding the tubular component 22, this is then closed at the axial end 24 by a base element 30, so that a canned pot is formed. The base element 30 preferably may be formed likewise of plastic, and be molded into the previously injected tubular component 22. Alternatively, the base element 30 may be manufactured separately and be inserted later into the tubular component 22. As is shown, a positive-fit connection is created between the base element 30 and the tubular component 22, by the inwardly bent, axial peripheral edge of the tubular component 22 engaging into a peripheral groove 32 of the base element 30.

A collar 34 is applied on the outer periphery of the tubular component 22, at the opposite axial end 26, which faces the impeller 8. The collar 34 is of metal, preferably of stainless steel, and is annular, wherein its inner diameter is matched to the outer diameter of the tubular component 22 at the axial end 26. The ring of the collar 34 has a U-shaped cross-section, wherein the transverse limb faces the axial end 26. The inner wall 36 of the collar 34 bears on the peripheral wall of the tubular component 22 in a parallel manner, and is connected to this.

The connection between the inner wall 36 of the collar 34, and the tubular component 22, is already effected during the manufacturing process, i.e., the molding process of the tubular component 22, by previously inserting the collar 34 into the tool, so that the tubular component 22 is molded directly onto the inner wall 36 of the collar 34. Thus a firm, positive-fit connection and/or material fit connection between the plastic of the tubular component 22 and the inner wall 36 of the collar 34 is created. In order to improve this connection, the inner wall 36 is previously roughened or structured on its inner periphery. This may preferably be effected by laser machining, by which small recesses may be incorporated into the metal or sheet-metal of the collar 34 on the surface, into which recesses the plastic of the tubular component 22 then flows when injection molding. These recesses may particularly preferably yet comprise undercuts, by which an even firmer connection between both elements is created.

After the injection molding of the tubular component 22, with which the collar 34 is firmly connected directly with the tubular component 22, and after the subsequent insertion of the base element 30, the can 14 created in this manner is metallized. Thereby, a thin metal layer 38 is deposited on the outer surface of the can 14, as shown in FIG. 3. The metal layer 38 coats the complete outer surface of the tubular component 22 and the base element 30, as well as the collar 34. In this way, it is particularly also the transition regions between the collar 34 and the tubular component 22, as well as between the base element 30 and the tubular component 22, which is covered by the metal layer 38. The metal layer 38 ensures that a hermetic sealing of the can 14 and in particular of the peripheral wall of the tubular component 22 is created. This hermetic sealing by the metal layer 38 has the effect that fluid which is located in the rotor space 28, may not penetrate through the can 14 into the inside of the stator housing 18, in which the stator 16 is arranged. The metallization or coating 38 thereby permits the use of a plastic for the tubular component 22 and the base element 30, which per se is not diffusion-tight. Thus here, the plastic may be selected purely accordingly to the requirements with regard to the stability for the can 14, as well as according to manufacturing aspects.

A can 14 which is provided with a metal layer 38 on its outer side was previously described. Alternatively, it is also possible to provide the can 14 on its outer side as well as the inner surfaces of the inner space 28, with a metal layer by metallization. Moreover, it is alternatively also possible to metallize the can only on the inner walls of the inner space 28.

Figure 4:
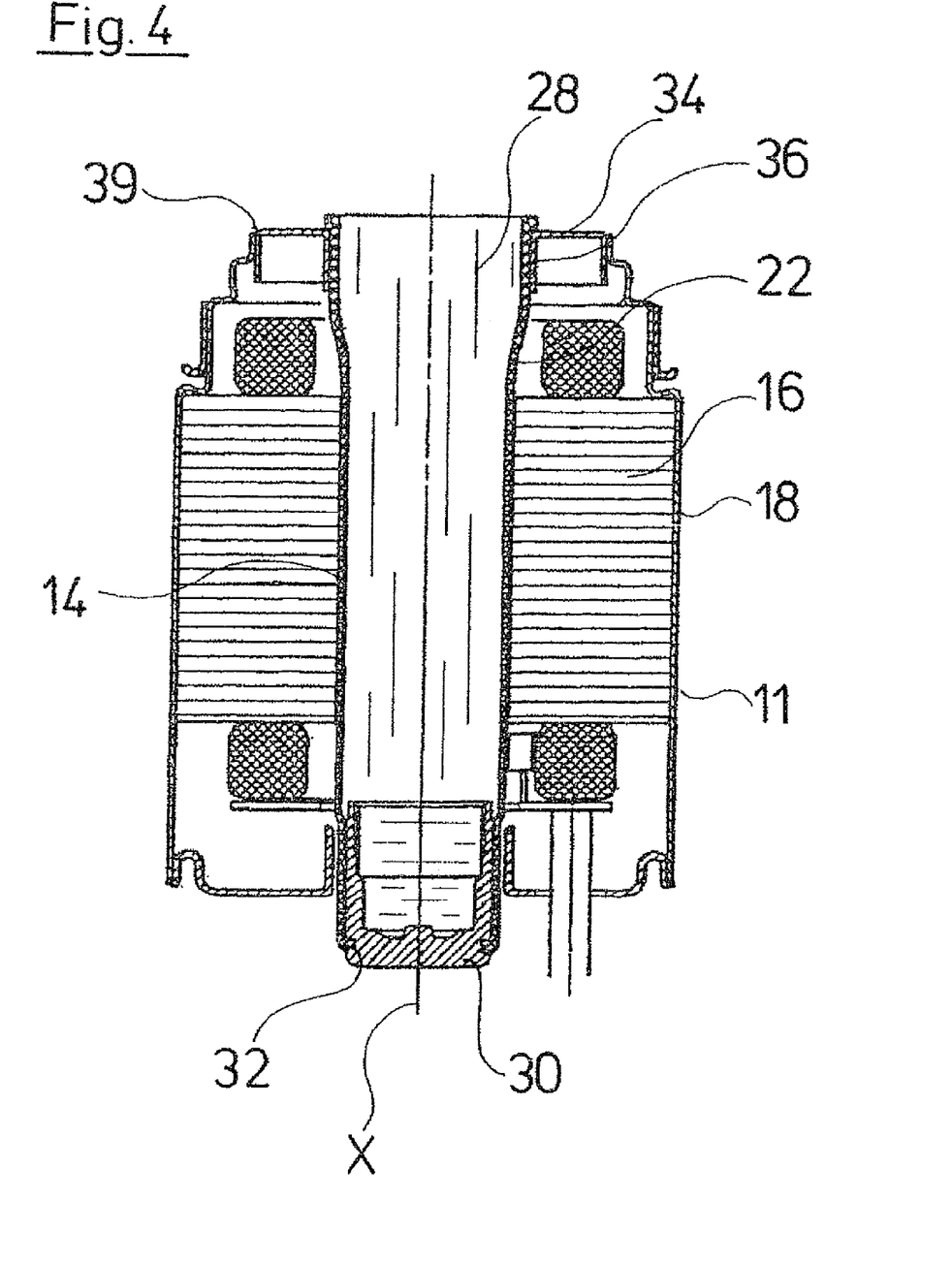
FIG. 4 is an enlarged, longitudinal, sectional view of the stator and can of FIG. 1.

The metallic collar 34 serves for connecting the can 14 to the remaining part of the stator housing 18. This, in particular, may be effected by a weld seam 39 on the outer periphery of the metallic collar 34. The collar 34 thus creates the connection to the other metallic components, from which the stator housing 18 is formed, as shown in FIG. 4.

The use of the can 14 of plastic, i.e., of a non-metallic material without magnetic properties, has the advantage that the can 14 influences the magnetic field between the stator 16 and the permanent magnet rotor 12 only little, or not at all, whereby the efficiency of the electric motor 11 is increased.

With regard to the pump assembly according to the invention, the diameter of the permanent magnet rotor 12 and the impeller 8 is kept small, in order to reduce the friction in the system, and thus the power loss, as much as possible. In order, despite this, to ensure a high efficiency of the electric motor 11, the permanent magnet rotor 12 is equipped with particularly strong permanent magnets, for example neodymium magnets. In the shown example, the rotor diameter is 19 mm. The shown electric motor 11 is designed for very high rotational speeds>20,000 rpm, in particular between 25,000 and 30,000 rpm. One may thus obtain a high delivery output with only one impeller 8 with a comparatively small diameter.

Figure 5:
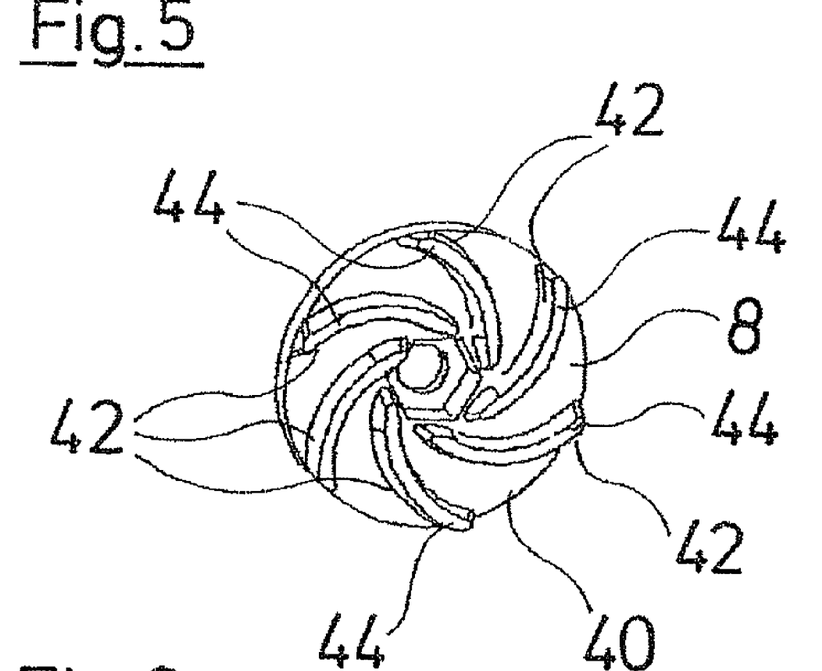
FIG. 5 is a perspective, axial end view of the impeller showing the impeller blades.
Figure 6:
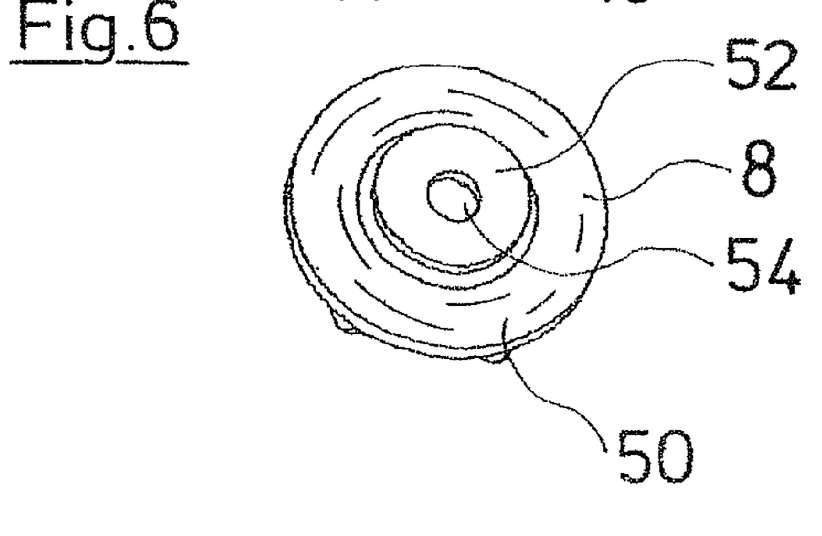
FIG. 6 is a perspective, axial view of the side of the impeller facing away from the impeller blades.

The impeller 8, which is shown in FIGS. 5 and 6 as an individual part, is manufactured of carbide, in order to ensure a high wear-resistance. The impeller blades 42 are formed on an axial end 40, which in the installed condition faces away from the electric motor 11. The impeller 8 is designed in an open manner, i.e., the impeller blades project from the axial end 40 of the impeller 8 and are not closed by a cover disk at the blade ends 44.

The end sides or end edges 44 of the impeller blades 42 are ground, and thus form a thrust bearing surface and sealing surface of the impeller 8. The end sides 44, in the installed condition, bear on an upthrust washer 46, which annularly surrounds the suction port 48 of the pump. The complete rotor 12 is supported via the impeller 8 in the axial direction on the upthrust washer 46 by the firm connection of the impeller 8 to the rotor shaft 10. That is, the end face of the upthrust washer 46, which faces the impeller 8, and the end sides 44 of the impeller blades 42 form an axial sliding bearing. The end sides 44 of the impeller blades 42 are pressed against the upthrust washer 46 by the axial pressing force of the impeller 8, such that a particularly good sealing between the impeller blades 42 and the upthrust washer 46 occurs. The losses in the pump are minimized by this, and the delivery output of the pump assembly is further increased, indeed at the high rotational speed of the motor described above. One may achieve a very high delivery output with the described, very small impeller in this manner, even with a single-stage design of the pump assembly. The impeller 8 thereby assumes the axial-side sealing with respect to the upthrust washer 46, on the suction port 48, and simultaneously assumes the thrust bearing function, so that here too, the number of components and the occurring friction may be minimized.

The rear side 50 of the impeller 8, which is opposite from the impeller blades 42, comprises a further annular sealing surface 52 which annularly surrounds the opening 54 for receiving the rotor shaft. The sealing surface 52 bears on a seal 56, which surrounds the rotor shaft 10 in a stationary manner, and seals the rotor space 28 in the inside of the can 14 to the pump space, in which the impeller 8 is arranged. This seal 56 is held bearing on the sealing surface 52 by spring action. The sealing 56 ensures that contamination in the fluid, which is delivered by the impeller 8, may not penetrate into the rotor space 28 in the inside of the can 14 and may not lead to undesired friction or damage there.

The upthrust washer 46 is preferably likewise designed of carbide or of ceramic. The side 58, which is opposite from the impeller 8, is designed in a spherical manner (not shown in FIG. 1), and is mounted in a spherical receiver in the pump housing, so that the upthrust washer 46 may align itself parallel to the impeller 8. This part of the upthrust washer, which forms the rear side 58, may be designed of a material other than carbide or ceramic, and may be connected to the part of the upthrust washer 46, which faces the impeller 8, for example by bonding.

The impeller 8 is peripherally surrounded by a spiral housing 6. The spiral housing 6, proceeding from the peripheral region of the impeller 8, extends helically to the connection stub 2, so that a flow deflection in the axial direction is effected. That is, the flow, which exits in the radial/tangential direction at the outer periphery of the impeller 8, is first deflected by the spiral housing 6 in a purely tangential direction or peripheral direction of the impeller 8, and is then deflected in the axial direction with as little loss as possible, on account of the helical winding of the spiral housing 6, so that the flow at the connection stub 2 may exit out of the pump assembly in the axial direction. The spiral housing 6 is preferably likewise manufactured of plastic as an injection molded part. The spiral housing 6, moreover, at its lower end which faces the impeller 8, further comprises the likewise spherical receiver for the upthrust washer 46, and centrally forms the suction port 48 of the pump, through which the fluid is sucked by rotation of the impeller 8. The outer housing of the pump assembly, in the region in which the spiral housing 6 is arranged in its interior, comprises entry openings 62 in its outer peripheral wall, through which the fluid enters from the outside, flows around the spiral housing 6 from the outside, and then enters the suction port 48.

One may create a very powerful, compact submersible pump assembly, which with only one stage achieves a large delivery output with a high operational speed, with all the elements which have been previously described, i.e., with a can 14 of plastic with a metallization, with a small pressure sensor of the rotor 12, with an impeller 8 of carbide having a small diameter, which simultaneously assumes the sealing and axial mounting.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. A pump assembly having a wet-running electric motor, wherein the electric motor (11) comprises a can (14) comprising a non-metallic material having at least one additional, hermetically sealing layer (38) which comprises a coating on an inner and/or outer peripheral surface of the non-metallic material, and wherein the coating comprises a metallization of the non-metallic material.

2. The pump assembly according to claim 1, wherein the can (14) comprises a fiber-reinforced plastic.

3. The pump assembly according to claim 1, wherein the can (14) comprises a tubular component (22) and a base element (30), which closes the tubular component (22) at a first axial end (24).

4. The pump assembly according to claim 3, wherein the base element (30) is molded with the tubular component (22).

5. The pump assembly according to claim 3, wherein the tubular component (22) and the base element (30) comprise anon-metallic material, and after assembly are provided with the additional layer (38).

6. The pump assembly according to claim 1, further comprising a radially outwardly extending, metallic collar (34) formed at one axial end (26) of the can (14) on an outer periphery.

7. The pump assembly according to claim 6, wherein the collar (34) is connected to the non-metallic material with a positive fit and/or material fit, and together with the non-metallic material has the additional layer (38).

8. The pump assembly according to claim 6, wherein a surface (36) of the collar (34) is structured before connection to the non-metallic material of the can (14).

9. The pump assembly according to claim 1, wherein the electric motor (11) comprises a permanent magnet rotor (12).

10. The pump assembly according to claim 1, wherein the assembly is a submersible pump assembly.

11. The pump assembly according to claim 1, further comprising an impeller (8) drivable by the electric motor (11) at a maximal rotational speed of greater than 20000 rpm, wherein the impeller (8) is axially sealed in a region of a suction port (48) of the pump assembly.

12. The pump assembly according to claim 11, wherein at least one axial end of the impeller (8) forms a thrust bearing surface, which simultaneously serves as an axial sealing surface.

13. The pump assembly according to claim 12, wherein the impeller (8) at its axial end (40), on which impeller blades (42) are arranged, is designed in an open manner, and axial end sides (44) of the impeller blades (42) form a thrust bearing surface of the impeller (8).

14. The pump assembly according to claim 11, wherein the impeller (8) is fixed on a rotor shaft (10) in an axial direction (X) of the pump assembly.

15. The pump assembly according to claim 11, wherein an axial side (50) of the impeller (8), which faces the electric motor (11), forms a sealing surface for sealing a rotor space (28) of the electric motor (11).

16. The pump assembly according to claim 11, wherein the impeller (8) comprises at least one surface of carbide or ceramic.

17. The pump assembly according to claim 11, wherein the pump assembly has only one stage.

18. The pump assembly according to claim 11, further comprising an upthrust washer (46) facing the impeller (8), the upthrust washer bearing on an axial side (44) of the impeller (8), such that it forms a thrust bearing surface (58).

19. The pump assembly according to claim 18, wherein the upthrust washer (46) comprises at least one surface of carbide or ceramic material.

20. The pump assembly according to claim 18, wherein the thrust bearing surface (58) of the upthrust washer (46) which is opposite the impeller (8) has a spherical shape.

21. The pump assembly according to claim 1, wherein the impeller (8) is surrounded by a spiral housing (6) or a diffuser.

22. The pump assembly according to claim 21, wherein the spiral housing (6) extends helically such that an exit opening of the spiral housing (6) is aligned with the impeller (8) in an axial direction (X).

23. The pump assembly according to claim 1, wherein the coating is deposited on the non-metallic material by vapor deposition.

24. The pump assembly according to claim 1, wherein the electric motor (11) comprises a rotor (12) and a stator (16), and wherein the can (14) is positioned between the rotor (12) and the stator (16), and wherein the stator (16) annularly surrounds the can (14).

25. The pump assembly according to claim 1, wherein the hermetically sealing layer (38) is applied to at least one selected from the inner and outer peripheral surface of a pre-manufactured supporting structure made from the non-metallic material.

\* \* \* \* \*